US010360520B2

(12) United States Patent
Kanamatareddy et al.

(10) Patent No.: US 10,360,520 B2
(45) Date of Patent: Jul. 23, 2019

(54) OPERATIONAL DATA RATIONALIZATION

(71) Applicant: INTERNATIONAL BUSINESS MACHINES CORPORATION, Armonk, NY (US)

(72) Inventors: Ravi Kumar Reddy Kanamatareddy, Hyderabad (IN); Siba P. Satapathy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1235 days.

(21) Appl. No.: 14/590,261

(22) Filed: Jan. 6, 2015

(65) Prior Publication Data

US 2016/0196510 A1    Jul. 7, 2016

(51) Int. Cl.
*G06Q 10/06*    (2012.01)
*G06F 16/2458*    (2019.01)

(52) U.S. Cl.
CPC ....... *G06Q 10/063* (2013.01); *G06F 16/2465* (2019.01)

(58) Field of Classification Search
None
See application file for complete search history.

(56) References Cited

U.S. PATENT DOCUMENTS 7,181,438 B1 * 2/2007 Szabo ................. G06F 21/6245
7,356,532 B2 * 4/2008 Wiser ...................... G06F 9/466
707/703

(Continued)

FOREIGN PATENT DOCUMENTS

WO    WO-2007005030 A2 *    1/2007    ......... H04L 41/5067
WO    WO-2007064879 A2 *    6/2007    ............ G06F 9/546

(Continued)

OTHER PUBLICATIONS

Abu-Elkheir, Mervat, Mohammad Hayajneh, and Najah Ali. "Data management for the internet of things: Design primitives and solution." Sensors 13.11 (2013): 15582-15612. (Year: 2013).*

(Continued)

*Primary Examiner* — Thomas L Mansfield
*Assistant Examiner* — Derick J Holzmacher
(74) *Attorney, Agent, or Firm* — Schmeiser, Olsen & Watts; Mark C. Vallone

(57) ABSTRACT

An approach is provided for rationalizing operational data. A current data profile of a current dataset utilized by a current data transaction is determined. Persisted knowledge of previous data transactions is determined to include a previous data profile of a previous dataset that matches the current data profile. If the persisted knowledge indicates that data size and shape corrections were applied to the previous dataset, filtering corrections of the current dataset based on the data size and shape corrections are determined, the persisted knowledge is rationalized based on the filtering corrections, and queries of the current transaction are modified based on the filtering corrections, or if the data size and shape corrections were not applied to the previous dataset, the persisted knowledge is rationalized based on the data profile match and the queries of the current transaction are modified based on the rationalized persisted knowledge.

11 Claims, 12 Drawing Sheets

(56) References Cited

U.S. PATENT DOCUMENTS

| | | | |
|---|---|---|---|
| 7,490,073 B1* | 2/2009 | Qureshi | G06F 11/079 706/50 |
| 7,730,003 B2* | 6/2010 | Pinto | G06Q 30/0201 703/22 |
| 7,908,125 B2* | 3/2011 | Yeh | G06F 16/288 703/2 |
| 8,108,235 B2 | 1/2012 | Chowdhary et al. | |
| 8,401,986 B1* | 3/2013 | Franke | G06N 5/02 706/47 |
| 8,417,715 B1 | 4/2013 | Bruckhaus et al. | |
| 8,484,252 B2 | 7/2013 | Grosset et al. | |
| 8,700,658 B2* | 4/2014 | Rambhia | G06N 5/046 707/769 |
| 9,110,969 B2* | 8/2015 | Li | G06F 16/2462 |
| 2004/0122809 A1* | 6/2004 | Clark | G06F 16/313 |
| 2006/0007901 A1* | 1/2006 | Roskowski | H04W 24/00 370/338 |
| 2006/0218157 A1 | 9/2006 | Sourov et al. | |
| 2007/0171924 A1* | 7/2007 | Eisner | G06F 9/546 370/401 |
| 2008/0071722 A1* | 3/2008 | Wookey | G06F 8/71 706/61 |
| 2009/0132395 A1* | 5/2009 | Lam | G06Q 30/02 705/30 |
| 2009/0254588 A1 | 10/2009 | Li | |
| 2011/0119300 A1 | 5/2011 | Marcade | |
| 2011/0246415 A1 | 10/2011 | Li et al. | |
| 2011/0313979 A1* | 12/2011 | Roberts | G06F 16/2365 707/690 |
| 2012/0102053 A1 | 4/2012 | Barrett et al. | |
| 2012/0166372 A1* | 6/2012 | Ilyas | G06N 5/02 706/14 |
| 2012/0254242 A1* | 10/2012 | Kanagasabapathi | G06N 5/025 707/776 |
| 2013/0066900 A1* | 3/2013 | Narasimhan | G06F 16/215 707/769 |
| 2013/0110766 A1* | 5/2013 | Promhouse | G06F 9/466 707/607 |
| 2013/0110788 A1* | 5/2013 | Gong | G06F 16/21 707/667 |
| 2014/0006338 A1 | 1/2014 | Watson et al. | |
| 2014/0025622 A1 | 1/2014 | Oaten et al. | |
| 2014/0067800 A1 | 3/2014 | Sharma | |
| 2014/0074557 A1 | 3/2014 | Rallapalli et al. | |
| 2014/0164944 A1* | 6/2014 | Sivakumar | G06F 16/9577 715/746 |
| 2014/0280759 A1* | 9/2014 | Cameron | H04L 67/10 709/219 |
| 2014/0372462 A1* | 12/2014 | Leahy Wise | G06F 16/284 707/756 |
| 2015/0169582 A1* | 6/2015 | Jain | G06F 16/24578 707/748 |

FOREIGN PATENT DOCUMENTS

| | | | |
|---|---|---|---|
| WO | WO-2008092149 A2 * | 7/2008 | G06Q 10/06 |
| WO | WO-2009118716 A1 * | 10/2009 | H04L 29/1216 |
| WO | 2010004369 | 1/2010 | |
| WO | 2010014082 | 2/2010 | |
| WO | WO-2013033098 A1 * | 3/2013 | G06N 5/046 |
| WO | WO-2013106883 A1 * | 7/2013 | G06F 16/258 |
| WO | WO-2015088995 A1 * | 6/2015 | G06F 17/3053 |

OTHER PUBLICATIONS

Semmel, Ralph D., and Robert P. Winkler. "Integrating reengineered databases to support data fusion." Journal of Systems and Software 30.1-2 (1995): 127-135. (Year: 1995).*

Hinke, Thomas H. "Inference aggregation detection in database management systems." Proceedings. 1988 IEEE Symposium on Security and Privacy. IEEE, 1988. (Year: 1988).*

Clean-up and Harness Your Legacy Data [online] [retrieved on Jun. 10, 2014]; retrieved from the Internet URL: <http://www.zylab.com/software/enterprise-information-management/legacy-data-clean-up.aspx>; 2 pages.

Patel, Mona; Pivotal HD 2.0: Hadoop Gets Real-Time [online] [retrieved on Jun. 10, 2014]; Mar. 18, 2014; retrieved from the Internet URL: <https://bigdatablog.emc.com/2014/03/18/pivotal-hd-2-0-hadoop-gets-real-time/>; 3 pages.

Morelli, Theresa et al.; IBM SPSS predictive analytics: Optimizing decisions at the point of impact; Redbooks; Nov. 12, 2010; 58 pages.

SAP HANA integrated predictive analytics, text and big data in a single package [online] [retrieved on Nov. 12, 2014]; retrieved from the Internet URL: <http://www.sap.com/pc.tech/in-meory-computing-hana/software/analytics/big-data.html>; 2 pages.

Jackson, Joab; IDG News Service; Jun. 11, 2013 [online] [retrieved on Jun. 9, 2014]; retrieved from the Internet URL: <http://www.itworld.com/360535/hp-aims-shrink-big-data>; 3 pages.

Anonymous; Statistical Information Architecture on IFW and Structure of OLAP; IP.com; IPCOM000225754D; Mar. 4, 2013; 8 pages.

Statsoft: Better Decisioning Solutions [online] [retrieved on Jun. 10, 2014]; retrieved from the Internet URL: <http://www.statsoft.com/>; 5 pages.

STATISTICA 10 New Features [online] [retrieved on Jun. 10, 2014]; retrieved from the Internet URL: <http://www.statsoft.com/Products/Statistica-Features/Version-10>; 5 pages.

* cited by examiner

| | | | | | | | |
|---|---|---|---|---|---|---|---|
| 32619478 | 0 | 20120428000001 | 1 | 60199083084 | telecom | 203.82.89.11 | 50219 | 20120427235958 | ... |
| 32619482 | 0 | 20120428000002 | 1 | 60198915461 | telecom | 203.82.89.107 | 50219 | 20120428000000 | |
| 32619494 | 0 | 20120428000007 | 1 | 60198778623 | prepaid.telecom3g | 203.82.89.107 | 50219 | 20120428000005 | |
| 32619495 | 0 | 20120428000007 | 1 | 60198778623 | prepaid.telecom3g | 203.82.89.107 | 50219 | 20120428000005 | |
| 32619502 | 0 | 20120428000012 | 1 | 60198773030 | prepaid.telecom3g | 203.82.89.107 | 50219 | 20120428000009 | |
| 32619503 | 0 | 20120428000012 | 1 | 60198773030 | prepaid.telecom3g | 203.82.89.107 | 50219 | 20120428000009 | |
| 32619510 | 0 | 20120428000015 | 1 | 60199036554 | prepaid.telecom3g | 203.82.89.11 | 50219 | 20120428000012 | |
| 32619512 | 0 | 20120428000015 | 1 | 60199036554 | prepaid.telecom3g | 203.82.89.11 | 50219 | 20120428000012 | |
| 32619529 | 0 | 20120428000023 | 1 | 60198789868 | prepaid.telecom3g | 203.82.89.107 | 50219 | 20120428000021 | |
| 32619530 | 0 | 20120428000023 | 1 | 60198789868 | prepaid.telecom3g | 203.82.89.107 | 50219 | 20120428000021 | |
| 32619557 | 0 | 20120428000036 | 1 | 60199301724 | prepaid.telecom3g | 203.82.89.11 | 50219 | 20120428000034 | |
| 32619558 | 0 | 20120428000036 | 1 | 60199301724 | prepaid.telecom3g | 203.82.89.11 | 50219 | 20120428000034 | |
| 32619559 | 0 | 20120428000036 | 1 | 60199301724 | prepaid.telecom3g | 203.82.89.11 | 50219 | 20120428000034 | |
| 32619583 | 0 | 20120428000045 | 1 | 60198917287 | telecom | 203.82.89.107 | 50219 | 20120428000042 | |
| 32619593 | 0 | 20120428000048 | 1 | 60199083084 | telecom | 203.82.89.11 | 50219 | 20120428000045 | |
| 32619595 | 0 | 20120428000049 | 1 | 60199066378 | prepaid.telecom3g | 203.82.89.11 | 50219 | 20120428000047 | |
| 32619596 | 0 | 20120428000049 | 1 | 60199066378 | prepaid.telecom3g | 203.82.89.11 | 50219 | 20120428000047 | |
| 32619613 | 0 | 20120428000056 | 1 | 60198929425 | telecom | 203.82.89.107 | 50219 | 20120428000054 | |
| 32619620 | 0 | 20120428000101 | 1 | 60198895168 | prepaid.telecom3g | 203.82.89.107 | 50219 | 20120428000058 | |
| 32619621 | 0 | 20120428000101 | 1 | 60198895168 | prepaid.telecom3g | 203.82.89.107 | 50219 | 20120428000058 | |
| 32619622 | 0 | 20120428000101 | 1 | 60198916270 | telecom | 203.82.89.107 | 50219 | 20120428000059 | |
| 32619631 | 0 | 20120428000105 | 1 | 60199015350 | prepaid.telecom3g | 203.82.89.11 | 50219 | 20120428000102 | |
| 32619632 | 0 | 20120428000105 | 1 | 60199015350 | prepaid.telecom3g | 203.82.89.11 | 50219 | 20120428000102 | |
| 32619702 | 0 | 20120428000135 | 1 | 60199219378 | prepaid.telecom3g | 203.82.89.11 | 50219 | 20120428000133 | |
| 32619703 | 0 | 20120428000135 | 1 | 60199219378 | prepaid.telecom3g | 203.82.89.11 | 50219 | 20120428000133 | |
| 32619704 | 0 | 20120428000136 | 1 | 60199150895 | telecom | 203.82.89.11 | 50219 | 20120428000133 | |
| 32619705 | 0 | 20120428000136 | 1 | 60199150895 | telecom | 203.82.89.11 | 50219 | 20120428000133 | |
| 32619707 | 0 | 20120428000139 | 1 | 60198945833 | telecom | 203.82.89.107 | 50219 | 20120428000137 | |
| 32619708 | 0 | 20120428000139 | 1 | 60199083084 | telecom | 203.82.89.11 | 50219 | 20120428000137 | |
| 32619709 | 0 | 20120428000139 | 1 | 60198978412 | telecom | 203.82.89.107 | 50219 | 20120428000139 | |
| 32619713 | 0 | 20120428000142 | 1 | 60199301445 | telecom | 203.82.89.11 | 50219 | 20120428000139 | |
| ... | | | | | | | | | |

| 32619482 | 0 | 20120428000002 | 1 | 60198915461 | telecom | 203.82.89.107 | 50219 | 20120428000000 |
| 32619558 | 0 | 20120428000036 | 1 | 60199301724 | prepaid.telecom3g | 203.82.89.11 | 50219 | 20120428000034 |
| 32619613 | 0 | 20120428000056 | 1 | 60198929425 | telecom | 203.82.89.107 | 50219 | 20120428000054 |
| 32619620 | 0 | 20120428000101 | 1 | 60198895168 | prepaid.telecom3g | 203.82.89.107 | 50219 | 20120428000058 |
| 32619704 | 0 | 20120428000136 | 1 | 60199150895 | telecom | 203.82.89.11 | 50219 | 20120428000133 |
| 32619707 | 0 | 20120428000139 | 1 | 60198945833 | telecom | 203.82.89.107 | 50219 | 20120428000137 |
| 32619713 | 0 | 20120428000142 | 1 | 60199301445 | telecom | 203.82.89.11 | 50219 | 20120428000139 |
| ⋮ | | | | | | | | ⋮ |

| 32619482 | 0 | 20120428000002 | 1 | 60198915461 | telecom | 203.82.89.107 | 50219 | 20120428000000 |
| 32619558 | 0 | 20120428000036 | 1 | 60199301724 | prepaid.telecom3g | 203.82.89.11 | 50219 | 20120428000034 |
| 32619613 | 0 | 20120428000056 | 1 | 60198929425 | telecom | 203.82.89.107 | 50219 | 20120428000054 |
| 32619620 | 0 | 20120428000101 | 1 | 60198895168 | prepaid.telecom3g | 203.82.89.107 | 50219 | 20120428000058 |
| 32619704 | 0 | 20120428000136 | 1 | 60199150895 | telecom | 203.82.89.11 | 50219 | 20120428000133 |
| 32619707 | 0 | 20120428000139 | 1 | 60198945833 | telecom | 203.82.89.107 | 50219 | 20120428000137 |
| 32619713 | 0 | 20120428000142 | 1 | 60199301445 | telecom | 203.82.89.11 | 50219 | 20120428000139 |

FIG. 6C

| ⇩ | ⇩ | ⇩ | ⇩ | ⇩ | ⇩ | ⇩ | ⇩ |
|---|---|---|---|---|---|---|---|
| 32619478 | 0 | 20120428000001 | 1 | 60199083084 | telecom | 203.82.89.11 | 50219 | 20120427235958 |
| 32619482 | 0 | 20120428000002 | 1 | 60198915461 | telecom | 203.82.89.107 | 50219 | 20120428000000 |
| 32619494 | 0 | 20120428000007 | 1 | 60198778623 | prepaid.telecom3g | 203.82.89.107 | 50219 | 20120428000005 |
| 32619495 | 0 | 20120428000007 | 1 | 60198778623 | prepaid.telecom3g | 203.82.89.107 | 50219 | 20120428000005 |
| 32619502 | 0 | 20120428000012 | 1 | 60198773030 | prepaid.telecom3g | 203.82.89.107 | 50219 | 20120428000009 |
| 32619503 | 0 | 20120428000012 | 1 | 60198773030 | prepaid.telecom3g | 203.82.89.107 | 50219 | 20120428000009 |
| 32619510 | 0 | 20120428000015 | 1 | 60199036554 | prepaid.telecom3g | 203.82.89.11 | 50219 | 20120428000012 |
| 32619512 | 0 | 20120428000015 | 1 | 60199036554 | prepaid.telecom3g | 203.82.89.11 | 50219 | 20120428000012 |
| 32619529 | 0 | 20120428000023 | 1 | 60198789868 | prepaid.telecom3g | 203.82.89.107 | 50219 | 20120428000021 |
| 32619530 | 0 | 20120428000023 | 1 | 60198789868 | prepaid.telecom3g | 203.82.89.107 | 50219 | 20120428000021 |
| 32619557 | 0 | 20120428000036 | 1 | 60199301724 | prepaid.telecom3g | 203.82.89.11 | 50219 | 20120428000034 |
| 32619558 | 0 | 20120428000036 | 1 | 60199301724 | prepaid.telecom3g | 203.82.89.11 | 50219 | 20120428000034 |
| 32619559 | 0 | 20120428000036 | 1 | 60199301724 | prepaid.telecom3g | 203.82.89.11 | 50219 | 20120428000034 |
| 32619583 | 0 | 20120428000045 | 1 | 60198917287 | telecom | 203.82.89.11 | 50219 | 20120428000042 |
| 32619593 | 0 | 20120428000048 | 1 | 60199083084 | telecom | 203.82.89.11 | 50219 | 20120428000045 |
| 32619595 | 0 | 20120428000049 | 1 | 60199066378 | prepaid.telecom3g | 203.82.89.107 | 50219 | 20120428000047 |
| 32619596 | 0 | 20120428000049 | 1 | 60199066378 | prepaid.telecom3g | 203.82.89.107 | 50219 | 20120428000047 |
| 32619613 | 0 | 20120428000056 | 1 | 60198929425 | telecom | 203.82.89.107 | 50219 | 20120428000054 |
| 32619620 | 0 | 20120428000101 | 1 | 60198895168 | prepaid.telecom3g | 203.82.89.107 | 50219 | 20120428000058 |
| 32619621 | 0 | 20120428000101 | 1 | 60198895168 | prepaid.telecom3g | 203.82.89.107 | 50219 | 20120428000058 |
| 32619622 | 0 | 20120428000101 | 1 | 60198916270 | telecom | 203.82.89.107 | 50219 | 20120428000059 |
| 32619631 | 0 | 20120428000105 | 1 | 60199015350 | prepaid.telecom3g | 203.82.89.11 | 50219 | 20120428000102 |
| 32619632 | 0 | 20120428000105 | 1 | 60199015350 | prepaid.telecom3g | 203.82.89.11 | 50219 | 20120428000102 |
| 32619702 | 0 | 20120428000135 | 1 | 60199219378 | prepaid.telecom3g | 203.82.89.107 | 50219 | 20120428000133 |
| 32619703 | 0 | 20120428000135 | 1 | 60199219378 | prepaid.telecom3g | 203.82.89.107 | 50219 | 20120428000133 |
| 32619704 | 0 | 20120428000136 | 1 | 60199150895 | telecom | 203.82.89.11 | 50219 | 20120428000133 |
| 32619705 | 0 | 20120428000136 | 1 | 60199150895 | telecom | 203.82.89.11 | 50219 | 20120428000133 |
| 32619707 | 0 | 20120428000139 | 1 | 60198945833 | telecom | 203.82.89.11 | 50219 | 20120428000137 |
| 32619708 | 0 | 20120428000139 | 1 | 60199083084 | telecom | 203.82.89.107 | 50219 | 20120428000137 |
| 32619709 | 0 | 20120428000139 | 1 | 60198978412 | telecom | 203.82.89.107 | 50219 | 20120428000137 |
| 32619713 | 0 | 20120428000142 | 1 | 60199301445 | telecom | 203.82.89.11 | 50219 | 20120428000139 |

| | | | | | |
|---|---|---|---|---|---|
| | | | ⋮ | | |
| 32619478 | 20120428000001 | 60199083084 | telecom | 203.82.89.11 | 20120427235958 |
| 32619495 | 20120428000007 | 6019878623 | prepaid.telecom3g | 203.82.89.107 | 20120428000005 |
| 32619503 | 20120428000012 | 6019873030 | prepaid.telecom3g | 203.82.89.107 | 20120428000009 |
| 32619529 | 20120428000023 | 6019878868 | prepaid.telecom3g | 203.82.89.107 | 20120428000021 |
| 32619530 | 20120428000023 | 6019878868 | prepaid.telecom3g | 203.82.89.107 | 20120428000021 |
| 32619557 | 20120428000036 | 6019301724 | prepaid.telecom3g | 203.82.89.11 | 20120428000034 |
| 32619558 | 20120428000036 | 6019301724 | prepaid.telecom3g | 203.82.89.11 | 20120428000034 |
| 32619559 | 20120428000036 | 6019301724 | prepaid.telecom3g | 203.82.89.11 | 20120428000034 |
| 32619593 | 20120428000048 | 60199083084 | telecom | 203.82.89.11 | 20120428000045 |
| 32619595 | 20120428000049 | 60199066378 | prepaid.telecom3g | 203.82.89.11 | 20120428000047 |
| 32619622 | 20120428000101 | 60198916270 | telecom | 203.82.89.107 | 20120428000059 |
| 32619631 | 20120428000105 | 60199015350 | prepaid.telecom3g | 203.82.89.107 | 20120428000102 |
| 32619707 | 20120428000139 | 60199845833 | telecom | | |
| 32619708 | 20120428000139 | 60199083084 | telecom | 203.82.89.107 | 20120428000137 |
| 32619713 | 20120428000142 | 60199301445 | telecom | 203.82.89.11 | 20120428000137 |
| | | | | | 20120428000139 |
| | | | ⋮ | | |

OPERATIONAL DATA RATIONALIZATION

TECHNICAL FIELD

The present invention relates to managing operational data, and more particularly to automatically rationalizing operational data in enterprise application systems.

BACKGROUND

Over many years of running and elapsed operations of a business, the business accumulates a large amount of data that needs to be organized between archives and active usage for data analysis for business purposes. Because of the enormous size of the accumulated data and because of a significant amount of redundancies in the data, extracting references for analysis is an extremely difficult task that is slow and inefficient. The business may have the difficult decision of whether to discard data archives or retain them for historical business references. Further, business dimensions influenced by effective information technology (IT) and storage systems demand more business situation centric data for use in regular business operations and analytics. Still further, known redundant and static procedures of an enterprise that analyzed data in a previous cycle of transactions or a few years ago may not produce appropriate results for a current transaction in the enterprise because business dynamics have changed.

BRIEF SUMMARY

In a first embodiment, the present invention provides a method of rationalizing operational data. The method includes a computer determining a current data profile of a current dataset being utilized in a current data transaction of a business. The method further includes the computer determining persisted knowledge of a plurality of previous data transactions of the business stored in a data repository includes a previous data profile that matches the current data profile. The previous data profile is a data profile of a previous dataset utilized in a previous data transaction included in the plurality of previous data transactions. The method further includes based on the persisted knowledge including the previous data profile that matches the current data profile, the computer determining whether the persisted knowledge includes an indication that data size correction and data shape correction were applied to the previous dataset. The method further includes if the data size correction and data shape correction were applied to the previous dataset, the computer determining filtering corrections of the current dataset based on the retrieved data size correction and data shape correction, rationalizing the persisted knowledge based on the filtering corrections and the previous data profile matching the current data profile, and modifying queries of the current transaction based on the filtering corrections, or if the data size correction and data shape correction were not applied to the previous dataset, the computer rationalizing the persisted knowledge based on the previous data profile matching the current data profile and modifying the queries of the current transaction based on the rationalized persisted knowledge.

In a second embodiment, the present invention provides a computer system including a central processing unit (CPU); a memory coupled to the CPU; and a computer-readable storage device coupled to the CPU. The storage device includes instructions that are executed by the CPU via the memory to implement a method of rationalizing operational data. The method includes the computer system determining a current data profile of a current dataset being utilized in a current data transaction of a business. The method further includes the computer system determining persisted knowledge of a plurality of previous data transactions of the business stored in a data repository includes a previous data profile that matches the current data profile. The previous data profile is a data profile of a previous dataset utilized in a previous data transaction included in the plurality of previous data transactions. The method further includes based on the persisted knowledge including the previous data profile that matches the current data profile, the computer system determining whether the persisted knowledge includes an indication that data size correction and data shape correction were applied to the previous dataset. The method further includes if the data size correction and data shape correction were applied to the previous dataset, the computer system determining filtering corrections of the current dataset based on the retrieved data size correction and data shape correction, rationalizing the persisted knowledge based on the filtering corrections and the previous data profile matching the current data profile, and modifying queries of the current transaction based on the filtering corrections, or if the data size correction and data shape correction were not applied to the previous dataset, the computer system rationalizing the persisted knowledge based on the previous data profile matching the current data profile and modifying the queries of the current transaction based on the rationalized persisted knowledge.

In a third embodiment, the present invention provides a computer program product including a computer-readable storage device and a computer-readable program code stored in the computer-readable storage device. The computer-readable program code includes instructions that are executed by a central processing unit (CPU) of a computer system to implement a method of rationalizing operational data. The method includes the computer system determining a current data profile of a current dataset being utilized in a current data transaction of a business. The method further includes the computer system determining persisted knowledge of a plurality of previous data transactions of the business stored in a data repository includes a previous data profile that matches the current data profile. The previous data profile is a data profile of a previous dataset utilized in a previous data transaction included in the plurality of previous data transactions. The method further includes based on the persisted knowledge including the previous data profile that matches the current data profile, the computer system determining whether the persisted knowledge includes an indication that data size correction and data shape correction were applied to the previous dataset. The method further includes if the data size correction and data shape correction were applied to the previous dataset, the computer system determining filtering corrections of the current dataset based on the retrieved data size correction and data shape correction, rationalizing the persisted knowledge based on the filtering corrections and the previous data profile matching the current data profile, and modifying queries of the current transaction based on the filtering corrections, or if the data size correction and data shape correction were not applied to the previous dataset, the computer system rationalizing the persisted knowledge based on the previous data profile matching the current data profile and modifying the queries of the current transaction based on the rationalized persisted knowledge.

Embodiments of the present invention provide a cyclic method to build intelligence and refine operational data, which results in faster analysis, quicker turnaround time for business decisions, and a more efficient handling of data redundancy. Embodiments of the present invention rationalize operational data, reduce data redundancy from historical to present operations, optimize the size of data for effective analytics models and procedures, optimize references or indexes to generate quicker access to data based on the needs of a business situation, rebuild data references to improve relationships between historical data and operational data, and optimize complex data queries which extract data based on the needs of a business situation.

BRIEF DESCRIPTION OF THE DRAWINGS

FIG. 6A is an example of a new transaction dataset whose data is to be rationalized by the processes of FIG. 2 and FIG. 3, in accordance with embodiments of the present invention.

FIG. 6B is an example of a sample of the dataset included in FIG. 6A, where the sample is generated in the process of FIG. 3, in accordance with embodiments of the present invention.

FIG. 6C is an example of a result of applying a statistical inference to the sample in FIG. 6B, where applying the statistical inference is included in the process of FIG. 3, in accordance with embodiments of the present invention.

FIG. 6D is an example of the dataset in FIG. 6A together with filtering recommendations based on filtering rules, where determining the filtering rules is included in the process of FIG. 3, in accordance with embodiments of the present invention.

FIG. 6E is an example of an enabled dataset resulting from applying the filtering recommendations in FIG. 6D to the dataset in FIG. 6A, where generating the enabled dataset is included in the process of FIG. 3, in accordance with embodiments of the present invention.

DETAILED DESCRIPTION

Overview

Embodiments of the present invention transform raw context-free operational data into context-sensitive data. The context is derived from the way transactions were treated earlier and persisted as knowledge for similar situations in future transactions. The context is dynamic to business sensitivity of data as directed in the data profile in day-to-day transactional endeavors. The context is also a knowledge which is corrective of adjustments to a business situation, environment, circumstance, or perspective. A dynamically changing business situation is the basis for determining a context of the operational data by iteratively using attributes of the business situation in the recent past. Embodiments of the present invention rationalize stored transactional data of an enterprise for effective use based on a business situation, by using inherent intelligence in data persisted from previous rationalizations of transactional data. The persisted data provides more knowledge about business dynamics than does static processes.

In one embodiment, a cyclic method includes steps of Load, Infer, Filter, and Enable (also referred to herein as the LIFE method or simply as the acronym of LIFE), which are implemented by an augmentation gateway (i.e., a proxy server) and knowledge persistence tool. In the Load step, an incoming request from a requesting application includes switches indicating a data access method and a type of data and results in data extracted from a dataset. In the Infer step, the data set is validated for fitment to relationships suggested by the requesting application, and the request is provided with switches for using predetermined statistical inference algorithms in standard statistical applications. In the Filter step, a sampling technique is used to transform the dataset to a dataset nearest to the population representation. In the Enable step, the data is permitted to repeat a cycle of analysis or final policies on the dataset are returned to the requesting application.

System for Rationalizing Operational Data

Figure 1:
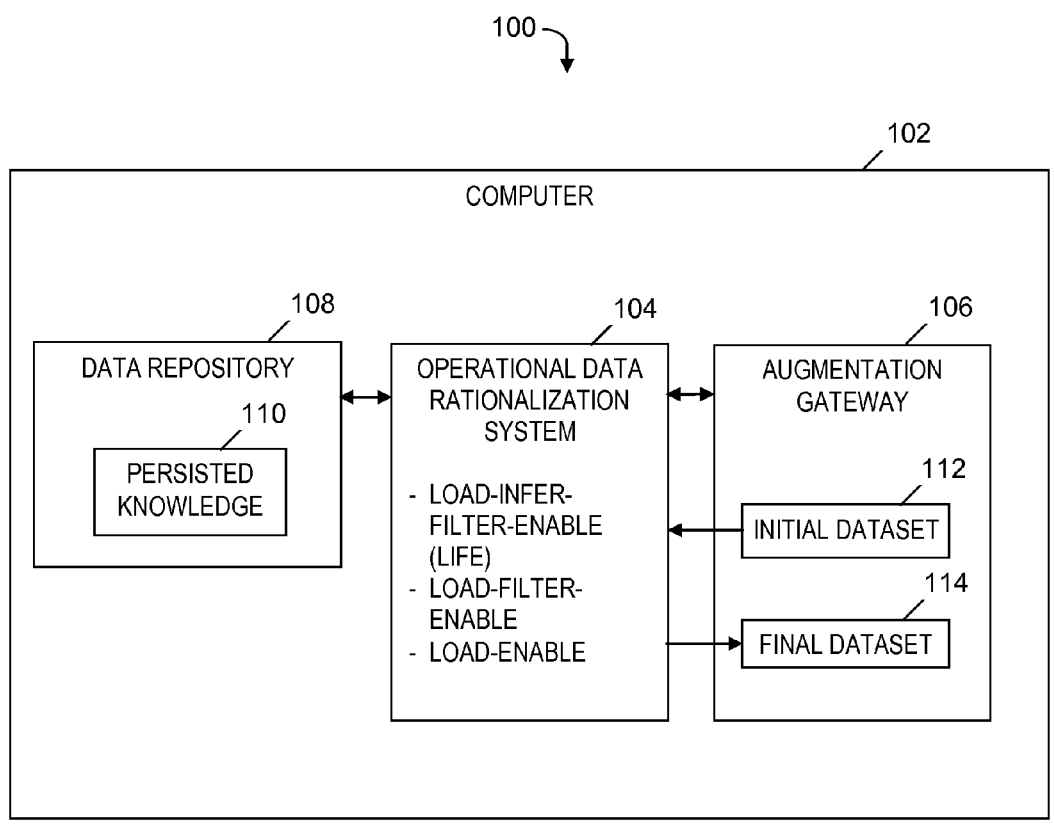
FIG. 1 is a block diagram of a system for rationalizing operational data, in accordance with embodiments of the present invention.

FIG. 1 is a block diagram of a system 100 for rationalizing operational data, in accordance with embodiments of the present invention. System 100 includes a computer 102, which executes a software-based operational data rationalization system 104. Computer 102 includes an augmentation gateway 106 and a data repository 108, which includes persisted knowledge 110. Augmentation gateway 106 can be a proxy server in the path of two or more transacting business applications or components to business rationalize the transactions between the business applications or components. Operational data rationalization system 104 receives an initial dataset 112 via augmentation gateway 106 and outputs a final dataset 114 via augmentation gateway 106.

Operational data rationalization system 104 provides an iterative method that includes load, infer, filter, and enable processes. The sequence of load, infer, filter, and enable processes is also referred to herein as LIFE. Intelligent configurations for datasets are stored in persisted knowledge 110 from a previous performance of LIFE. Augmentation gateway 106 receives a data transaction utilizing a dataset, checks prerequisites to validate the data size, quantities, security, etc. of the dataset, changes the data size and/or data shape in the dataset, and updates persistent knowledge 110 with the dataset changes, which is used in processing a subsequent data transaction. If a change in data presentation of the dataset is not needed, the process request is forwarded from the load process directly to the enable process.

When a request is made for a specific data analysis, operational data rationalization system 104 checks the earlier configurations stored in persisted knowledge 110. If the conditions in persisted knowledge 110 are the same as the request, then the process bypasses the infer and filter processes and continues with the enable process. Otherwise, the request goes through the infer and/or the filter process for sequential application of statistical inferences for viability and filtering the size of data for effective use of the data.

In one embodiment, augmentation gateway 106 sends continuous stochastic referencing from operational data models of an enterprise to operational data rationalization system 104, which provides a framework for both operational data transactions, as well as reassessment of an operational data store based on scheduled studies. By iterating functions provided by a combination of the load, infer, filter, and enable processes, operational data rationalization system 104 updates persisted knowledge 110 with acquired knowledge about an operational data model and stochastic switches.

In one embodiment, the load process receives initial dataset 112 from augmentation gateway 106 to identify presented data in initial dataset 112 for model qualifications. The load process uses stochastic models and data sampling to determine a recommendation for a type of predetermined stochastic switch or rebuilt stochastic model on an earlier known stochastic switch to a new stochastic switch for a data sample to be selected from initial dataset 112.

In one embodiment, the infer process groups and/or samples data in initial dataset 112 to determine a sample for assessment in the data rationalization process. The infer process uses stochastic models and the sample from initial dataset 112 to run statistical inferences.

In one embodiment, the filter process designs and formulates filter rules and makes recommendations for filtering data from initial dataset 112. The filter process uses applied stochastic switches to determine recommendations for modifying initial dataset 112.

The enable process imposes rules resulting from the recommendations for filtering to realize rationalization on the initial dataset 112, which results in a final dataset 114 (i.e., approved transactional dataset). The enable process returns the finalized logic resulting from the load, infer, and filter processes, the load and filter processes (bypassing the infer process), or the load process (bypassing the infer and filter processes) and stores the results in the persisted knowledge 110.

Operational data rationalization system 104 determines enterprise data rationalization objectives based on the operational data models (i.e., selective integrator for correlative assessment between initial dataset 112 and final dataset 114).

Operational data rationalization system 104 uses persisted knowledge 110 to determine applied stochastic switches on a data sample for assessment and stochastic model-based switches and data sampling.

Although not shown in FIG. 1, integrators for enterprise transactional data and data model change management may receive indications that the data model being used by operational data rationalization system 104 is deficient in terms of curve fitting (e.g., by an appropriate statistical test) and extracting the variance among the sample analyzed and assessed from initial dataset 112.

The functionality of the components of FIG. 1 is described in more detail in the discussions presented below relative to FIG. 2, FIGS. 3A-3B, FIG. 4, FIG. 5 and FIG. 8.

Process for Rationalizing Operational Data

Figure 2:
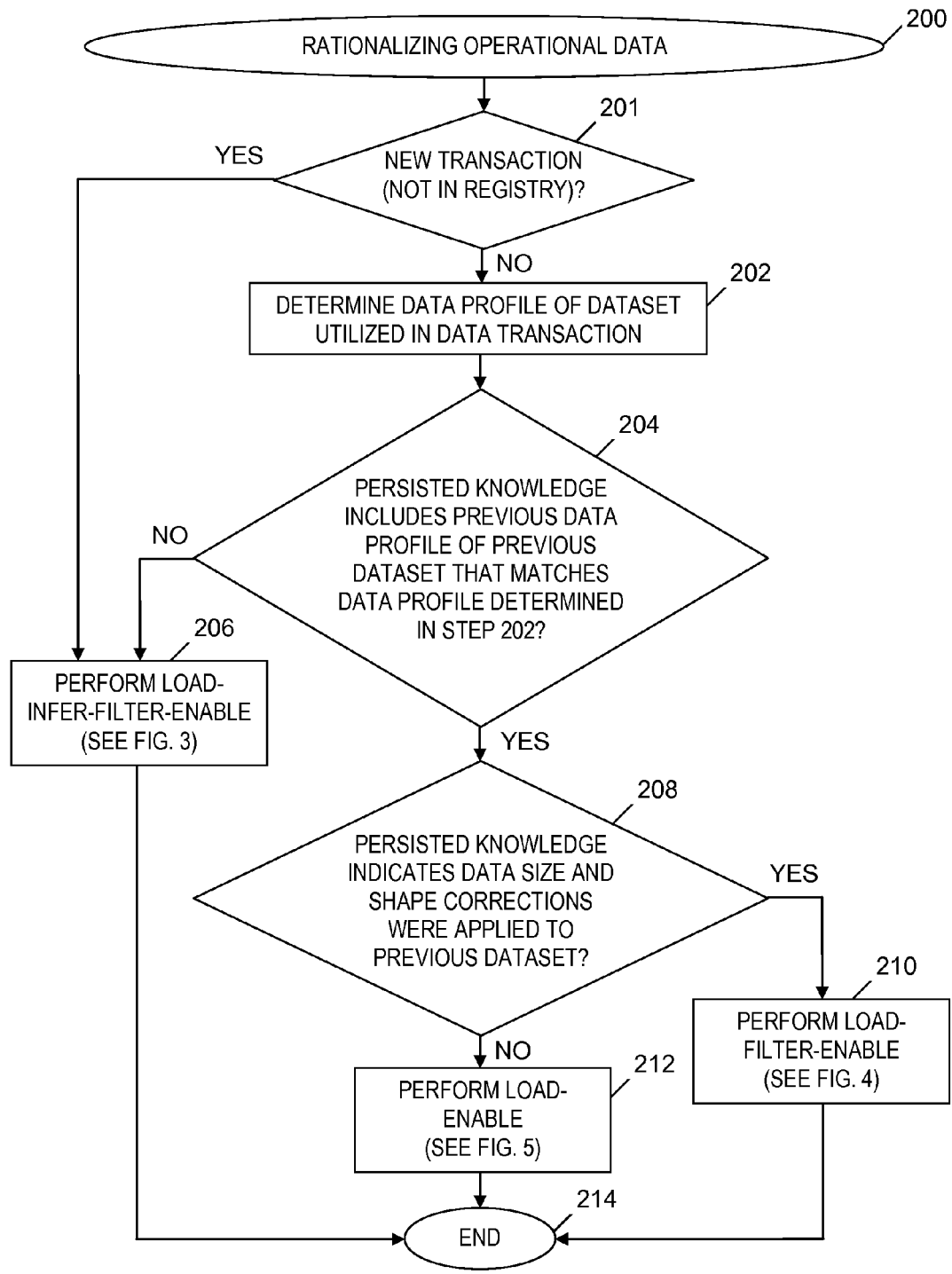
FIG. 2 is a flowchart of a process of rationalizing operational data, where the process is implemented in the system of FIG. 1, in accordance with embodiments of the present invention.

FIG. 2 is a flowchart of a process of rationalizing operational data, where the process is implemented in the system of FIG. 1, in accordance with embodiments of the present invention. The process of FIG. 2 starts at step 200. In step 201, augmentation gateway 106 (see FIG. 1) determines whether a current data transaction for an enterprise is a new data transaction of a type that has not been previously recorded in a registry of transactions that have been previously processed by operational data rationalization system 104 (see FIG. 1). If augmentation gateway 106 (see FIG. 1) determines in step 201 that the current data transaction is not a new data transaction (i.e., by determining that a source, destination, and service or data connection being used by the current data transaction matches a record in the registry), then the No branch of step 201 is taken and step 202 is performed.

Prior to step 202, operational data rationalization system 104 (see FIG. 1) receives initial dataset 112 (see FIG. 1) via augmentation gateway 106 (see FIG. 1). In step 202, operational data rationalization system 104 (see FIG. 1) determines the data profile of initial dataset 112 (see FIG. 1), which is being utilized in a current data transaction for an enterprise.

In step 204, operational data rationalization system 104 (see FIG. 1) determines whether persisted knowledge 110 (see FIG. 1) includes a previous data profile that matches the data profile determined in step 202, where the previous data profile is a data profile of a previous dataset that was utilized in a data transaction of the business that was processed by LIFE prior to the current data transaction. If operational data rationalization system 104 (see FIG. 1) determines in step 204 that persisted knowledge 110 (see FIG. 1) does not include the previous data profile that matches the data profile determined in step 202, then the No branch of step 204 is taken and step 206 is performed.

In step 206, operational data rationalization system 104 (see FIG. 1) performs the sequence of the load process, the infer process, the filter process and the enable process, which is described below in the discussion of FIG. 3.

Returning to step 204, if operational data rationalization system 104 (see FIG. 1) determines that persisted knowledge 110 (see FIG. 1) includes the previous data profile of the previous dataset that matches the data profile determined in step 202, then the Yes branch of step 204 is taken, and step 208 is performed.

In step 208, operational data rationalization system 104 (see FIG. 1) determines whether persisted knowledge 110 (see FIG. 1) includes an indication that a data size correction and/or a data shape correction was applied to the previous dataset. If operational data rationalization system 104 (see FIG. 1) determines in step 208 that persisted knowledge 110 (see FIG. 1) includes an indication that a data size correction and/or a data shape correction was applied to the previous dataset, then the Yes branch of step 208 is taken and step 210 is performed.

In step 210, operational data rationalization system 104 (see FIG. 1) performs the sequence of the load process, the filter process, and the enable process (i.e., bypassing the infer process in LIFE), which is described below in the discussion of FIG. 4.

Returning to step 208, if operational data rationalization system 104 (see FIG. 1) determines that persisted knowledge 110 (see FIG. 1) does not include an indication that a data size or data shape correction was applied to the previous dataset, then the No branch of step 208 is taken and step 212 is performed.

In step 212, operational data rationalization system 104 (see FIG. 1) performs the sequence of the load process immediately followed by the enable process (i.e., bypassing the infer and filter processes in LIFE), which is described below in the discussion of FIG. 5.

Step 214 follows each of steps 206, 210 and 212. In step 214, the process of FIG. 2 ends.

Returning to step 201, if augmentation gateway 106 (see FIG. 1) determines in step 201 that the current data transaction is a new data transaction (i.e., by determining that a source, destination, and service or data connection being used by the current data transaction does not match any record in the registry), then the Yes branch of step 201 is taken and step 206 is performed, as described above.

Load-Infer-Filter-Enable

Figure 3A:
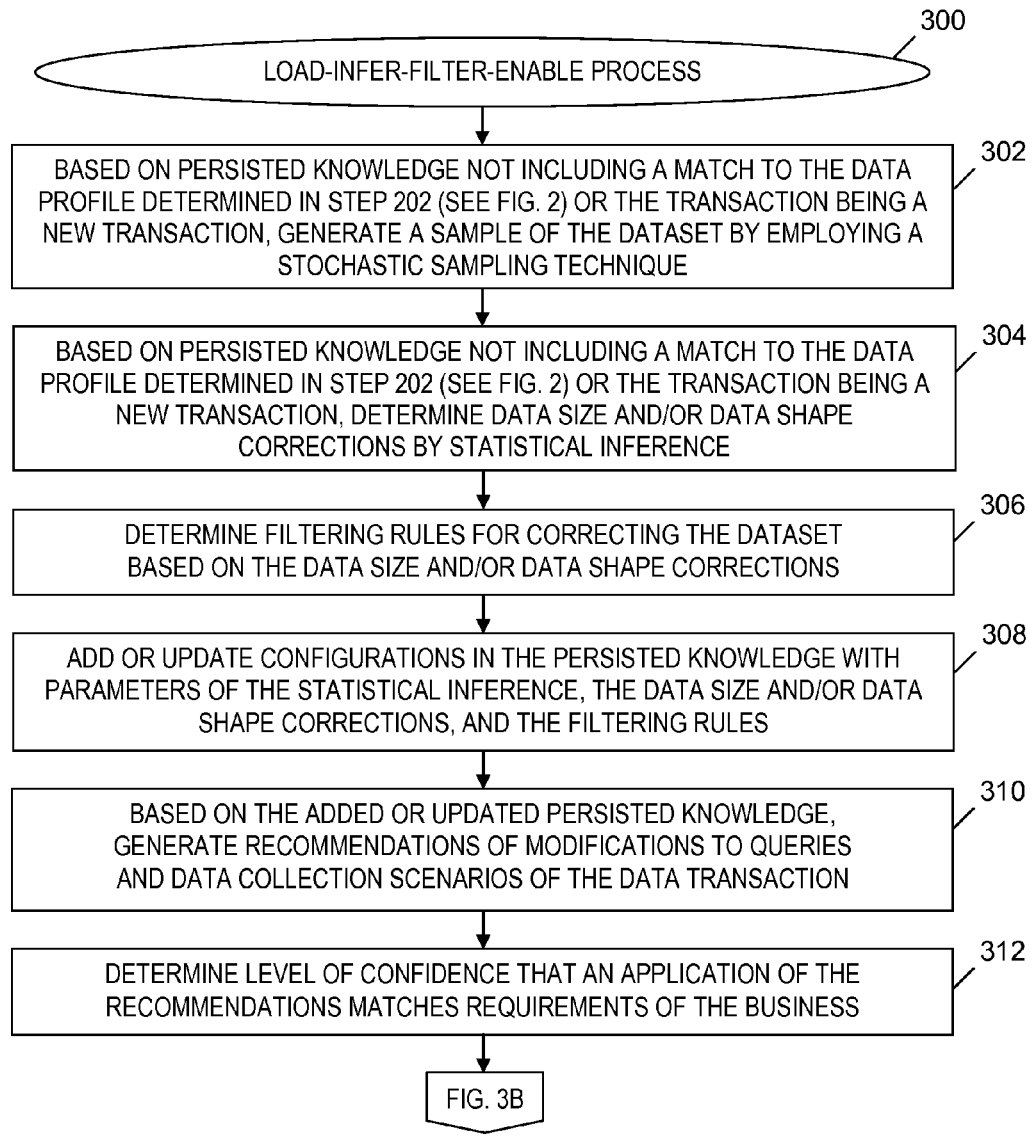
FIGS. 3A-3B depict a flowchart of a load-infer-filter-enable process included in the process of FIG. 2, in accordance with embodiments of the present invention.
Figure 3B:
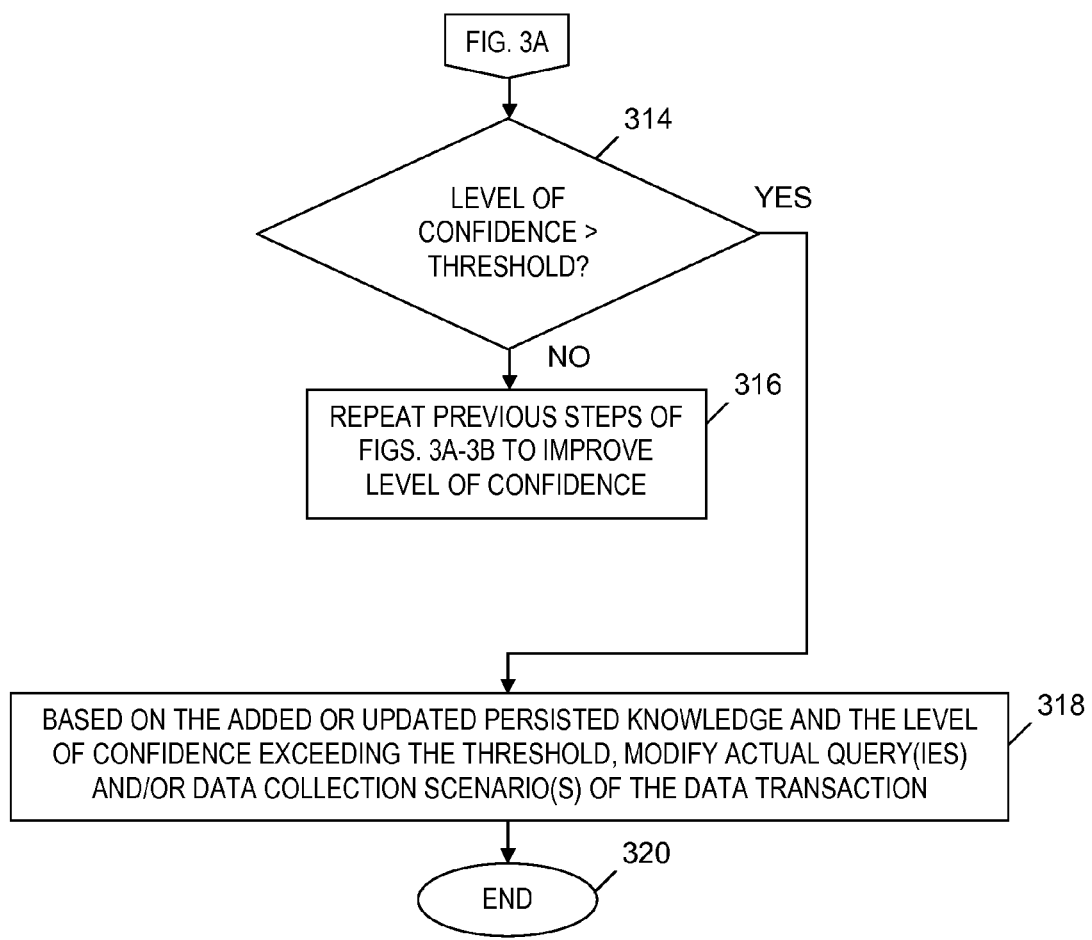

FIGS. 3A-3B depict a flowchart of a load-infer-filter-enable process included in the process of FIG. 2, in accordance with embodiments of the present invention. The process of FIGS. 3A-3B begins at step 300 in FIG. 3A, which follows the No branch of step 204 (see FIG. 2). In step 302, based on the current data transaction being a new data transaction (i.e., taking the Yes branch of step 201 in FIG. 2) or based on persisted knowledge 110 (see FIG. 1) not including a previous data profile that matches the data profile determined in step 202 (see FIG. 2), operational data rationalization system 104 (see FIG. 1) generates a sample of initial dataset 112 (see FIG. 1) by employing a stochastic sampling technique.

In step 304, based on the current data transaction being a new data transaction or based on persisted knowledge 110 (see FIG. 1) not including a previous data profile that matches the data profile determined in step 202 (see FIG. 2), operational data rationalization system 104 (see FIG. 1) determines a data size correction and/or a data shape correction by employing one or more inference techniques (e.g., a combination of mathematical, quantitative, statistical, rated multipliers, quadratic, linear and nonlinear, fuzzy logic, etc.).

In step 306, operational data rationalization system 104 (see FIG. 1) determines one or more filtering rules for correcting initial dataset 112 (see FIG. 1) based on the data size and/or data shape corrections determined in step 304.

In step 308, operational data rationalization system 104 (see FIG. 1) adds or updates configurations in persisted knowledge 110 (see FIG. 1) with parameters of the inference employed in step 304, the data size and/or data shape corrections determined in step 304, and the filtering rule(s) determined in step 306.

In step 310, based on the added or updated configurations in persisted knowledge 110 (see FIG. 1), operational data rationalization system 104 (see FIG. 1) generates recommendations of modifications to one or more queries and data collection scenarios of the current data transaction.

In step 312, operational data rationalization system 104 (see FIG. 1) determines a level of confidence that an application of the recommendations generated in step 310 matches requirements of the business. Step 312 is followed by step 314 in FIG. 3B.

In step 314, operational data rationalization system 104 (see FIG. 1) determines whether the level of confidence determined in step 312 (see FIG. 3A) exceeds a threshold level of confidence, which was received by operational data rationalization system 104 (see FIG. 1) prior to the start of the process of FIG. 2.

If operational data rationalization system 104 (see FIG. 1) determines in step 314 that the level of confidence determined in step 312 (see FIG. 3A) does not exceed the threshold level, then the No branch of step 314 is taken, and step 316 is performed.

In step 316, operational data rationalization system 104 (see FIG. 1) repeats the steps in FIGS. 3A-3B that occurred prior to step 316, until the level of confidence is improved enough to exceed the threshold level.

Returning to step 314, if operational data rationalization system 104 (see FIG. 1) determines that the level of confidence determined in step 312 (see FIG. 3A) exceeds the threshold level, then the Yes branch of step 314 is taken, and step 318 is performed.

In step 318, based on the updated configurations in persisted knowledge 110 (see FIG. 1) and the level of confidence exceeding the threshold, operational data rationalization system 104 (see FIG. 1) modifies one or more actual queries and/or one or more data collection scenarios of the current data transaction. The process of FIG. 3 ends at step 320.

After processing the current data transaction as a new data transaction, augmentation gateway 106 (see FIG. 1) adds the attributes of the current data transaction (i.e., source, destination, and service or data connection utilized by the transaction) to the registry, so that processing a subsequent data transaction that is similar to the formerly new data transaction includes augmentation gateway 106 (see FIG. 1) identifying the subsequent data transaction as a known transaction (i.e., augmentation gateway 106 (see FIG. 1) finds the attributes of the subsequent data transaction in the registry) and the No branch of step 201 (see FIG. 1) is taken, with subsequent steps in FIG. 2 performed as described above in the discussion of FIG. 2.

Load-Filter-Enable

Figure 4:
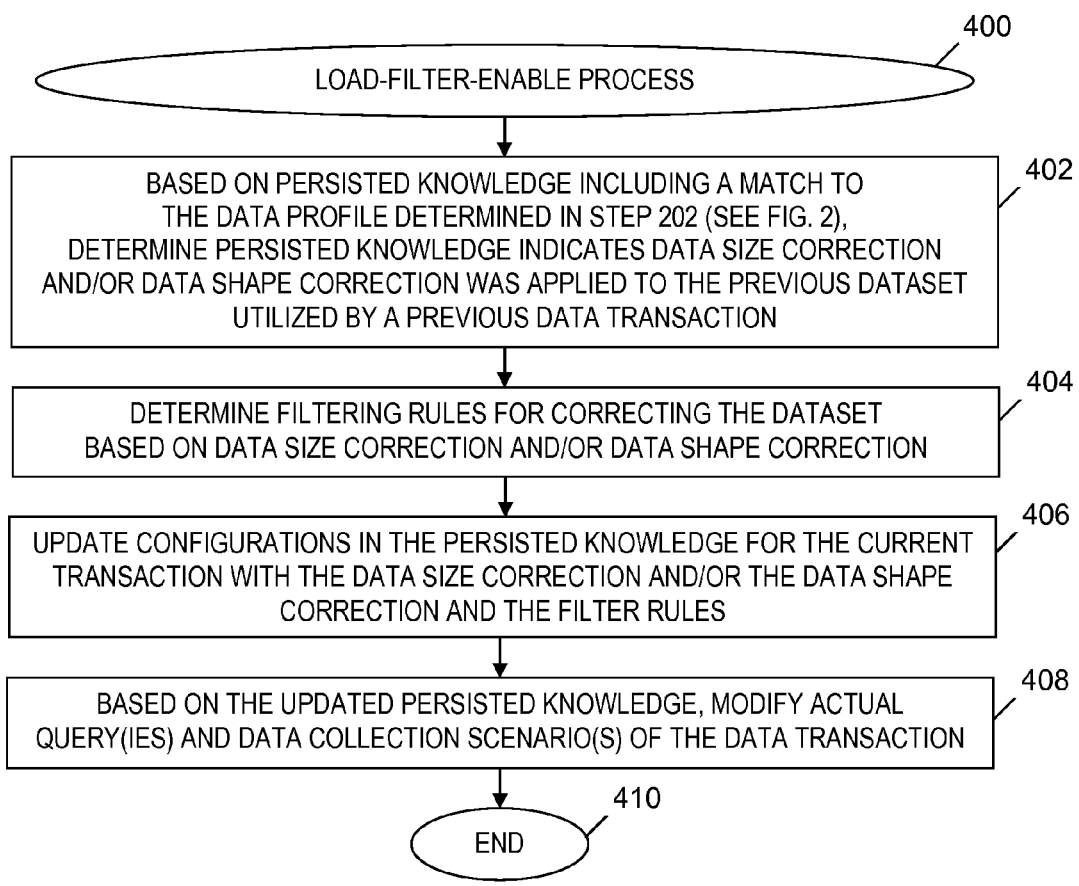
FIG. 4 is a flowchart of a load-filter-enable process included in the process of FIG. 2, in accordance with embodiments of the present invention.

FIG. 4 is a flowchart of a load-filter-enable process included in the process of FIG. 2, in accordance with embodiments of the present invention. The process of FIG. 4 starts at step 400, which follows the Yes branch of step 208 (see FIG. 2). In step 402, based on persisted knowledge 110 (see FIG. 1) including a previous data profile that matches the data profile determined in step 202 (see FIG. 2), operational data rationalization system 104 (see FIG. 1) determines that persisted knowledge 110 (see FIG. 1) indicates a result of a previous inference performed for the previous dataset, where the result includes a data size correction and/or data shape correction that was applied to the previous dataset utilized by a previous data transaction of the enterprise.

In step 404, operational data rationalization system 104 (see FIG. 1) determines filtering rules for correcting the dataset based on the data size and/or data shape corrections.

In step 406, operational data rationalization system 104 (see FIG. 1) updates configurations in persisted knowledge 110 (see FIG. 1) for the current data transaction with the data size and/or data shape corrections determined in step 402 and the filtering rules determined in step 404.

In step 408, based on the configurations in persisted knowledge 110 (see FIG. 1) updated in step 406, operational data rationalization system 104 (see FIG. 1) modifies one or more actual queries and/or one or more data collection scenarios of the current data transaction. The process of FIG. 4 ends at step 410.

Load-Enable

Figure 5:
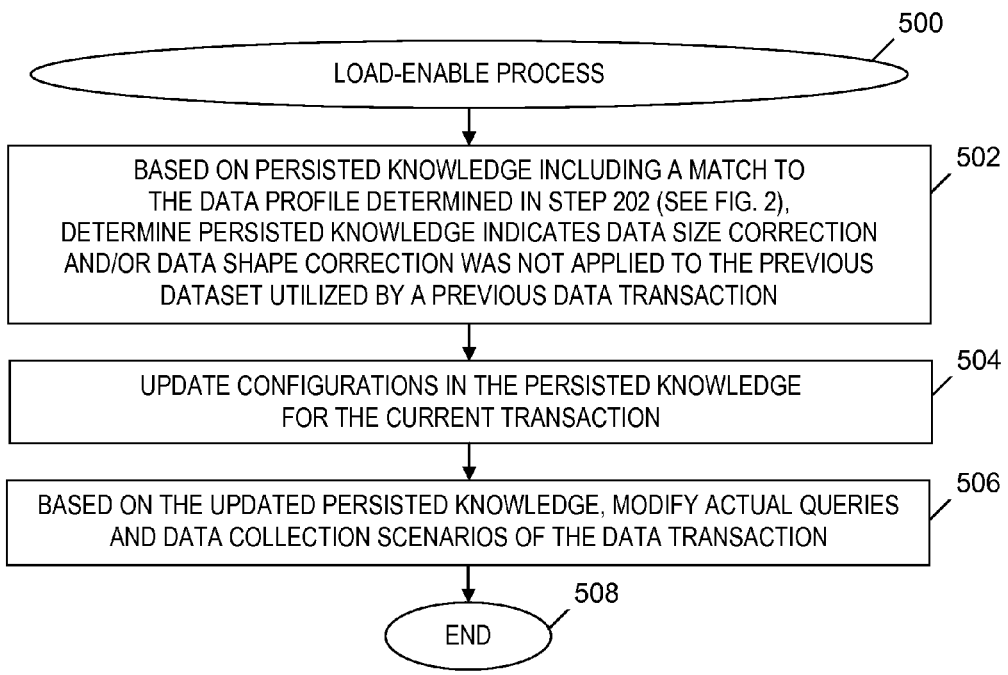
FIG. 5 is a flowchart of a load-enable process included in the process of FIG. 2, in accordance with embodiments of the present invention.

FIG. 5 is a flowchart of a load-enable process included in the process of FIG. 2, in accordance with embodiments of the present invention. The process of FIG. 5 starts at step 500, which follows the No branch of step 208 (see FIG. 2). In step 502, based on persisted knowledge 110 (see FIG. 1) including a previous data profile that matches the data profile determined in step 202 (see FIG. 2), operational data rationalization system 104 (see FIG. 1) determines that persisted knowledge 110 (see FIG. 1) indicates that a data size correction and/or data shape correction was not applied to the previous dataset utilized by a previous data transaction of the enterprise.

In step 504, operational data rationalization system 104 (see FIG. 1) updates configurations in persisted knowledge 110 (see FIG. 1) to indicate that data size and/or data shape corrections are not applied to the current data transaction.

In step 506, based on the configurations in persisted knowledge 110 (see FIG. 1) updated in step 504, operational data rationalization system 104 (see FIG. 1) modifies one or more actual queries and/or one or more data collection scenarios of the current data transaction. The process of FIG. 5 ends at step 508.

EXAMPLES

FIGS. 6A-6E depict examples of a process of rationalizing data in a new transaction dataset. FIG. 6A is an example of a new transaction dataset 600 whose data is to be rationalized by the processes of FIG. 2 and FIG. 3, in accordance with embodiments of the present invention. A data profile of new transaction dataset 600 is determined in step 202 (see FIG. 2). New transaction dataset 600 is an example of initial dataset 112 (see FIG. 1).

FIG. 6B is an example of a sample 610 of new transaction dataset 600 included in FIG. 6A, where sample 610 is generated in the process of FIG. 3, in accordance with embodiments of the present invention. Sample 610 is a result of performing step 302 (see FIG. 3A).

FIG. 6C is an example of a table 620 resulting from an application of a statistical inference to sample 610 in FIG. 6B, where the application of the statistical inference is included in the process of FIG. 3, in accordance with embodiments of the present invention. FIG. 6C includes arrows pointing to respective rows or columns of table 620, which indicate data size and data shape corrections determined by applying a statistical inference in step 304 (see FIG. 3A) to sample 610 (see FIG. 6B). The arrows pointing to columns in table 620 indicate the columns of sample 610 that do not need to be considered in a current transaction of a business because current requirements of the business do not specify the indicated columns. Similarly, the arrows pointing to rows in table 620 indicate rows of sample 610 that do not need to be considered in the current transaction because the current requirements of the business do not specify the indicated rows.

FIG. 6D is an example 650 of new transaction dataset 600 (see FIG. 6A) together with filtering recommendations based on filtering rules, where determining the filtering rules is included in the process of FIG. 3, in accordance with embodiments of the present invention. Arrows pointing to rows and columns in example 650 indicate the rows and columns of new transaction dataset 600 (see FIG. 6A) that will be masked as a result of applying the filtering recommendations based on filtering rules determined in step 306 (see FIG. 3A).

FIG. 6E is an example of an enabled dataset 680 resulting from applying the filtering recommendations in FIG. 6D to the new transaction dataset 600 in FIG. 6A, where generating enabled dataset 680 is included in the process of FIG. 3, in accordance with embodiments of the present invention. The rows and columns indicated by arrows in FIG. 6D are masked in step 310 (see FIG. 3A) to generate enabled dataset 680, which is an example of final dataset 114 (see FIG. 1).

Figure 7:
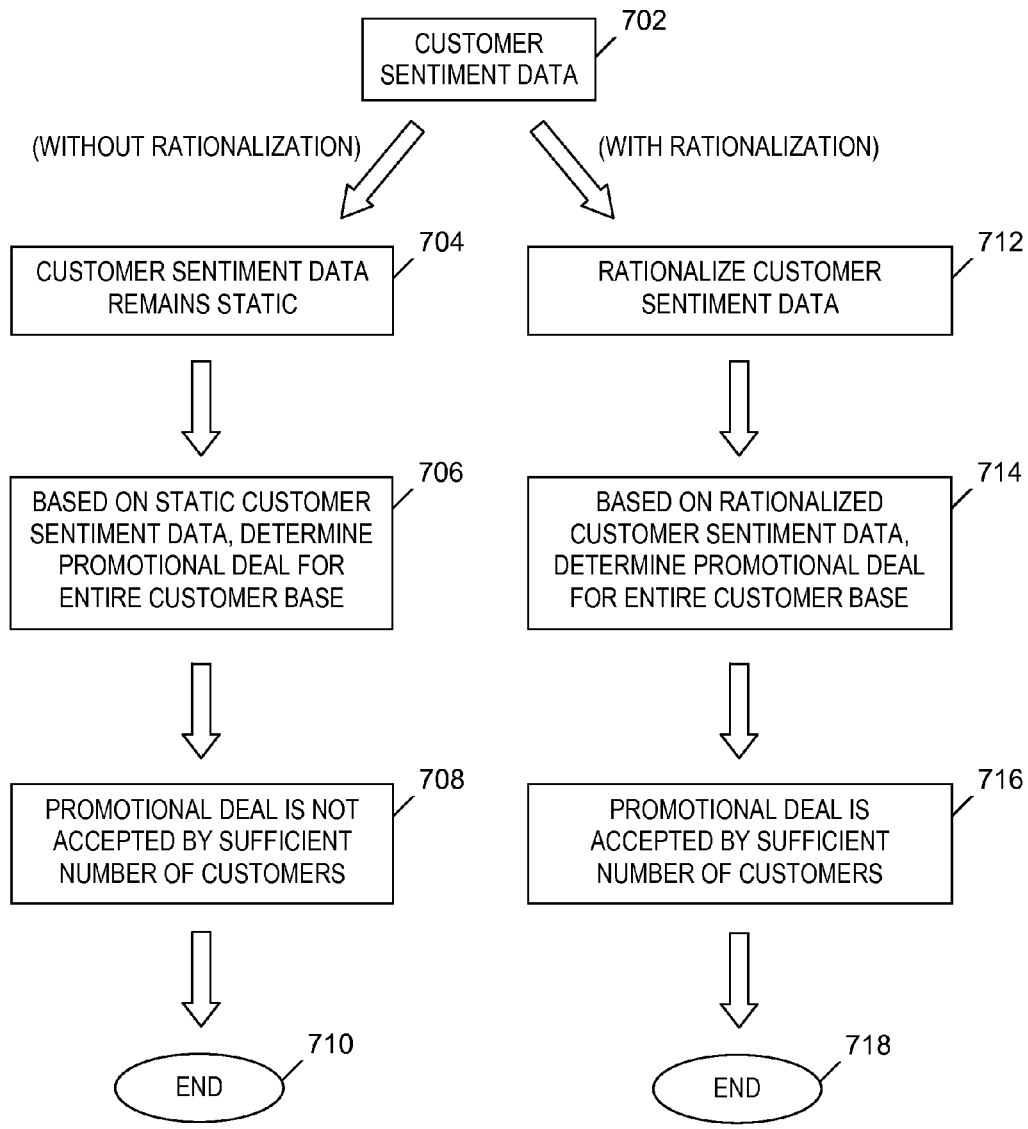
FIG. 7 depicts an example of rationalization of operational data using the process of FIG. 2, in accordance with embodiments of the present invention.

FIG. 7 depicts an example of rationalization of operational data using the process of FIG. 2, in accordance with embodiments of the present invention. It should be noted that the rationalization of operational data in FIG. 7 is merely an example, which does not express the full scope of embodiments presented herein. Although FIG. 7 utilizes customer sentiment data 702, embodiments of the present invention process various other kinds of data in operational situations between two or more transacting applications or components. The steps 704, 706, 708 and 710 in FIG. 7 are included in a process provided by a known customer sentiment data management system. In step 704, the customer sentiment data remains static in the known system (i.e., the customer sentiment data is not rationalized by embodiments of the present invention and is not updated to reflect a dynamically changing business situation). In step 706, based on the static customer sentiment data, the known system determines a promotional deal for the entire customer base of an enterprise. In step 708, the known system determines that the promotional deal is not accepted by a sufficient number of customers (i.e., a number of customers exceeding a threshold number). In step 710, the process provided by the known system ends.

The steps 712, 714, 716 and 718 in FIG. 7 are included in a process provided by one or more embodiments of the present invention. In step 712, operational data rationalization system 104 (see FIG. 1) rationalizes customer sentiment data 702. In step 714, based on the rationalized customer sentiment data, operational data rationalization system 104 (see FIG. 1) determines a promotional deal for the entire customer base of the enterprise. In step 716, operational data rationalization system 104 (see FIG. 1) determines that the promotional deal is accepted by a sufficient number of customers because the promotional deal was generated based on the rationalized customer sentiment data. In step 718, the process provided by operational data rationalization system 104 (see FIG. 1) ends.

Computer System

Figure 8:
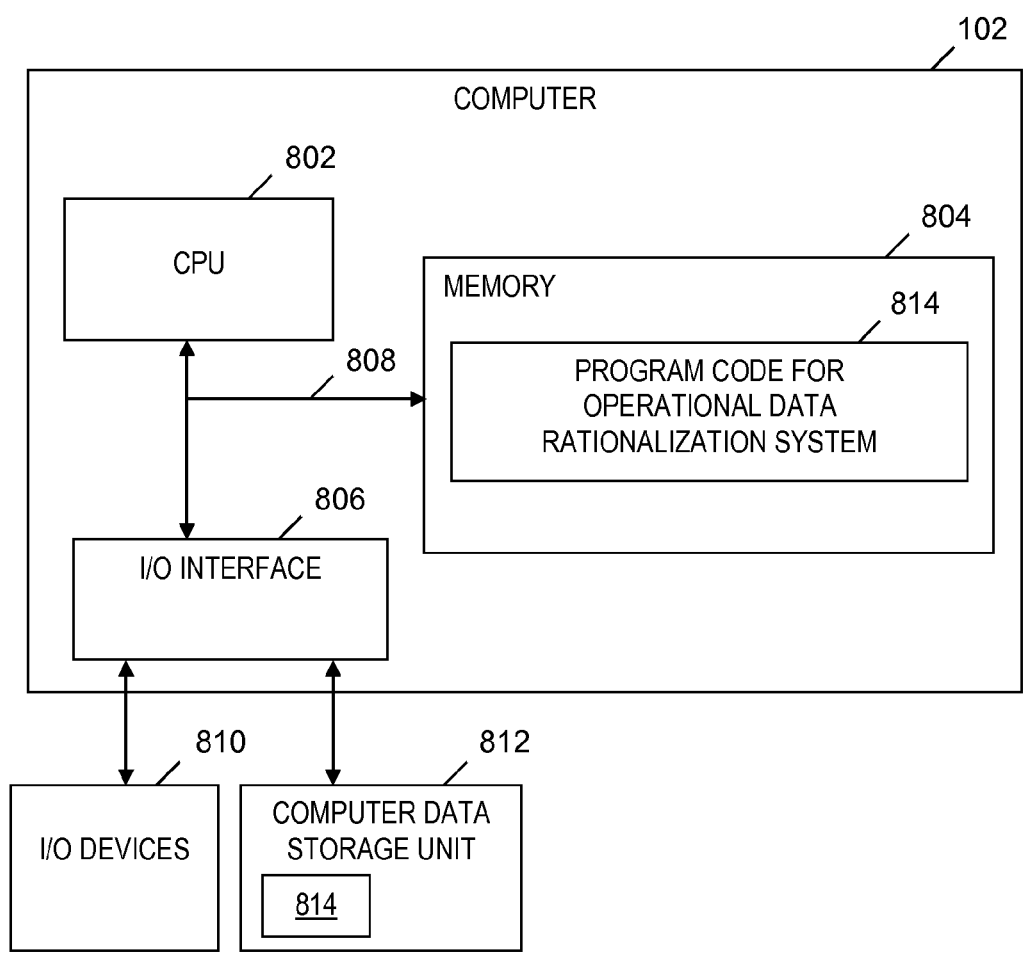
FIG. 8 is a block diagram of a computer that is included in the system of FIG. 1 and that implements the process of FIG. 2, in accordance with embodiments of the present invention.

FIG. 8 is a block diagram of a computer that is included in the system of FIG. 1 and that implements the processes of FIG. 2, FIGS. 3A-3B, FIG. 4, and FIG. 5 in accordance with embodiments of the present invention. Computer 102 is a computer system that generally includes a central processing unit (CPU) 802, a memory 804, an input/output (I/O) interface 806, and a bus 808. Further, computer 102 is coupled to I/O devices 810 and a computer data storage unit 812. CPU 802 performs computation and control functions of computer 102, including carrying out instructions included in program code 814 to perform a method of rationalizing operational data, where the instructions are carried out by CPU 802 via memory 804. CPU 802 may include a single processing unit, or be distributed across one or more processing units in one or more locations (e.g., on a client and server). Program code 814 includes program code for operational data rationalization system 104 (see FIG. 1). In one embodiment, program code (not shown) for augmentation gateway 106 (see FIG. 1) is included in memory 804 or computer data storage unit 812.

Memory 804 includes a known computer readable storage medium, which is described below. In one embodiment, cache memory elements of memory 804 provide temporary storage of at least some program code (e.g., program code 814) in order to reduce the number of times code must be retrieved from bulk storage while instructions of the program code are carried out. Moreover, similar to CPU 802, memory 804 may reside at a single physical location, including one or more types of data storage, or be distributed across a plurality of physical systems in various forms. Further, memory 804 can include data distributed across, for example, a local area network (LAN) or a wide area network (WAN).

I/O interface 806 includes any system for exchanging information to or from an external source. I/O devices 810 include any known type of external device, including a display device, keyboard, etc. Bus 808 provides a communication link between each of the components in computer 102, and may include any type of transmission link, including electrical, optical, wireless, etc.

I/O interface 806 also allows computer 102 to store information (e.g., data or program instructions such as program code 814) on and retrieve the information from computer data storage unit 812 or another computer data storage unit (not shown). Computer data storage unit 812 includes a known computer-readable storage medium, which is described below. In one embodiment, computer data storage unit 812 is a non-volatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814 that includes instructions that are carried out by CPU 802 via memory 804 to rationalize operational data. Although FIG. 8 depicts memory 804 as including program code 814, the present invention contemplates embodiments in which memory 804 does not include all of code 814 simultaneously, but instead at one time includes only a portion of code 814.

Further, memory 804 includes an operating system (not shown) and may include other systems not shown in FIG. 8.

Storage unit 812 and/or one or more other computer data storage units (not shown) that are coupled to computer 102 may include persisted knowledge 110, initial transacted dataset 112, and/or final transactional dataset 124 (see FIG. 1). In one embodiment, storage unit 812 is data repository 108 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to rationalizing operational data. Thus, an embodiment of the present invention discloses a process for supporting computer infrastructure, where the process includes providing at least one support service for at least one of integrating, hosting, maintaining and deploying computer-readable code (e.g., program code 814) in a computer system (e.g., computer 102) including one or more processors (e.g., CPU 802), wherein the processor(s) carry out instructions contained in the code causing the computer system to rationalize operational data. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of rationalizing operational data.

While it is understood that program code 814 for rationalizing operational data may be deployed by manually loading directly in client, server and proxy computers (not shown) via loading a computer-readable storage medium (e.g., computer data storage unit 812), program code 814 may also be automatically or semi-automatically deployed into computer 102 by sending program code 814 to a central server or a group of central servers. Program code 814 is then downloaded into client computers (e.g., computer 102) that will execute program code 814. Alternatively, program code 814 is sent directly to the client computer via e-mail. Program code 814 is then either detached to a directory on the client computer or loaded into a directory on the client computer by a button on the e-mail that executes a program that detaches program code 814 into a directory. Another alternative is to send program code 814 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 814 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of rationalizing operational data. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 804 and computer data storage unit 812) having computer readable program instructions 814 thereon for causing a processor (e.g., CPU 802) to carry out aspects of the present invention.

The computer readable storage medium (i.e., computer readable storage device) can be a tangible device that can retain and store instructions (e.g., program code 814) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium and a computer readable storage device, as used herein, are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 814) described herein can be downloaded to respective computing/processing devices (e.g., computer 102) from a computer readable storage medium or to an external computer or external storage device (e.g., computer data storage unit 812) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 814) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIGS. 3A-3B, FIG. 4 and FIG. 5) and/or block diagrams (e.g., FIG. 1 and FIG. 8) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 814).

These computer readable program instructions may be provided to a processor (e.g., CPU 802) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 812) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 814) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of rationalizing operational data, the method comprising the steps of:

an augmentation gateway determining that a current data transaction of a business is not a new transaction by determining that a source, a destination, and a data connection being used by the current data transaction matches a record in a registry of transactions previously processed by an operational data rationalization system, the augmentation gateway being a proxy server included in a computer and in a path of two or more transacting business applications and the operational data rationalization system being executed by one or more processors in the computer;

the computer receiving a current dataset being utilized in the current data transaction;

based on the current data transaction being not the new transaction, the computer determining a current data profile of the current dataset;

the computer determining that persisted knowledge of a plurality of previous data transactions of the business stored in a data repository does not include a previous data profile that matches the current data profile, the previous data profile being a data profile of a previous dataset utilized in a previous data transaction included in the plurality of previous data transactions;

based on the persisted knowledge not including the previous data profile that matches the current data profile, the computer generating a sample of the current dataset by employing a stochastic data sampling technique;

based on the persisted knowledge not including the previous data profile that matches the current data profile, the computer determining and updating a data size correction and a data shape correction by employing iterations of a statistical inference technique;

subsequent to the iterations of the statistical inference technique, the computer correcting data in the sample of the current dataset by utilizing the data size correction and the data shape correction to provide the data in the sample with a level of confidence that exceeds a threshold, the level of confidence being a measure that the data in the sample matches requirements of the business;

based on the data size correction and the data shape correction, the computer determining one or more filtering rules for correcting the current dataset;

the computer updating configurations in the persisted knowledge with parameters of the statistical inference technique, the data size correction, the data shape correction, and the one or more filtering rules;

based on the updated configurations in the persisted knowledge, the computer generating recommendations of modifications to one or more queries of the current data transaction;

the computer determining that an application of the recommendations of the modifications to the one or more queries provides data in the current dataset with the level of confidence of matching the requirements of the business that exceeds the threshold; and based on the application of the recommendations providing the data in the current dataset with the level of confidence exceeding the threshold, the augmentation gateway modifying the one or more queries of the current data transaction to provide the data in the current dataset with the level of confidence exceeding the threshold.

2. The method of claim 1, further comprising the steps of:

the computer receiving a data size correction and data shape correction from a statistical inference that was performed on a sample of the previous dataset prior to a receipt by the computer of the current data transaction; and based on the statistical inference, the computer determining a first level of confidence that data in the current dataset matches requirements of the business, and determining the first level of confidence is less than a second level of confidence that data in the previous dataset matches the requirements of the business, wherein the step of determining the one or more filtering rules for correcting the current dataset is based on the first level of confidence that data in the current dataset matches requirements of the business being less than the second level of confidence that data in the previous dataset matches the requirements of the business.

3. The method of claim 1, further comprising the step of:

providing at least one support service for at least one of creating, integrating, hosting, maintaining, and deploying computer-readable program code in the computer system, the program code being executed by a processor of the computer system to implement the steps of (i) determining that the current data transaction is not the new transaction, (ii) receiving the current dataset, (iii) determining the current data profile, (iv) determining that the persisted knowledge does not include the previous data profile that matches the current data profile, (v) generating the sample of the current dataset, (vi) determining and updating the data size correction and the data shape correction, (vii) correcting the data in the sample, (viii) determining the one or more filtering rules, (ix), updating the configurations in the persisted knowledge, (x) generating the recommendations of the modifications to the one or more queries, (xi) determining that the application of the recommendations provides the data in the current dataset with the level of confidence that exceeds the threshold, and (xii) modifying the one or more queries.

4. A computer system comprising:

an augmentation gateway;

a central processing unit (CPU);

a memory coupled to the CPU; and a computer-readable storage device coupled to the CPU, the storage device containing instructions that are executed by the CPU via the memory to implement a method of rationalizing operational data, the method comprising the steps of:

the augmentation gateway determining that a current data transaction of a business is not a new transaction by determining that a source, a destination, and a data connection being used by the current data transaction matches a record in a registry of transactions previously processed by an operational data rationalization system, the augmentation gateway being a proxy server in a path of two or more transacting business applications and the operational data rationalization system being executed by the CPU;

the computer system receiving a current dataset being utilized in the current data transaction;

based on the current data transaction being not the new transaction, the computer system determining a current data profile of the current dataset;

the computer system determining that persisted knowledge of a plurality of previous data transactions of the business stored in a data repository does not include a previous data profile that matches the current data profile, the previous data profile being a data profile of a previous dataset utilized in a previous data transaction included in the plurality of previous data transactions;

based on the persisted knowledge not including the previous data profile that matches the current data profile, the computer system generating a sample of the current dataset by employing a stochastic data sampling technique;

based on the persisted knowledge not including the previous data profile that matches the current data profile, the computer system determining and updating a data size correction and a data shape correction by employing iterations of a statistical inference technique;

subsequent to the iterations of the statistical inference technique, the computer system correcting data in the sample of the current dataset by utilizing the data size correction and the data shape correction to provide the data in the sample with a level of confidence that exceeds a threshold, the level of confidence being a measure that the data in the sample matches requirements of the business;

based on the data size correction and the data shape correction, the computer system determining one or more filtering rules for correcting the current dataset;

the computer system updating configurations in the persisted knowledge with parameters of the statistical inference technique, the data size correction, the data shape correction, and the one or more filtering rules;

based on the updated configurations in the persisted knowledge, the computer system generating recommendations of modifications to one or more queries of the current data transaction;

the computer system determining that an application of the recommendations of the modifications to the one or more queries provides data in the current dataset with the level of confidence of matching the requirements of the business that exceeds the threshold; and based on the application of the recommendations providing the data in the current dataset with the level of confidence exceeding the threshold, the augmentation gateway in the computer system modifying the one or more queries of the current data transaction to provide the data in the current dataset with the level of confidence exceeding the threshold.

5. A computer program product, comprising:

a computer-readable storage device; and a computer-readable program code stored in the computer-readable storage device, the computer-readable program code containing instructions that are executed by a central processing unit (CPU) of a computer system to implement a method of rationalizing operational data, the method comprising the steps of:

an augmentation gateway determining that a current data transaction of a business is not a new transaction by determining that a source, a destination, and a data connection being used by the current data transaction matches a record in a registry of transactions previously processed by an operational data rationalization system, the augmentation gateway being a proxy server included in the computer system and in a path of two or more transacting business applications and the operational data rationalization system being executed by the CPU in the computer system;

the computer system receiving a current dataset being utilized in the current data transaction;

based on the current data transaction being not the new transaction, the computer system determining a current data profile of the current dataset;

the computer system determining that persisted knowledge of a plurality of previous data transactions of the business stored in a data repository does not include a previous data profile that matches the current data profile, the previous data profile being a data profile of a previous dataset utilized in a previous data transaction included in the plurality of previous data transactions;

based on the persisted knowledge not including the previous data profile that matches the current data profile, the computer system generating a sample of the current dataset by employing a stochastic data sampling technique;

based on the persisted knowledge not including the previous data profile that matches the current data profile, the computer system determining and updating a data size correction and a data shape correction by employing iterations of a statistical inference technique;

subsequent to the iterations of the statistical inference technique, the computer system correcting data in the sample of the current dataset by utilizing the data size correction and the data shape correction to provide the data in the sample with a level of confidence that exceeds a threshold, the level of confidence being a measure that the data in the sample matches requirements of the business;

based on the data size correction and the data shape correction, the computer system determining one or more filtering rules for correcting the current dataset;

the computer system updating configurations in the persisted knowledge with parameters of the statistical inference technique, the data size correction, the data shape correction, and the one or more filtering rules;

based on the updated configurations in the persisted knowledge, the computer system generating recommendations of modifications to one or more queries of the current data transaction;

the computer system determining that an application of the recommendations of the modifications to the one or more queries provides data in the current dataset with the level of confidence of matching the requirements of the business that exceeds the threshold; and based on the application of the recommendations providing the data in the current dataset with the level of confidence exceeding the threshold, the augmentation gateway in the computer system modifying the one or more queries of the current data transaction to provide the data in the current dataset with the level of confidence exceeding the threshold.

6. The method of claim 1, further comprising the steps of:

the augmentation gateway determining that a source, a destination, and a data connection being used by a second data transaction does not match any one of the records in the registry of transactions previously processed by the operational data rationalization system;

based on the determination that the source, destination, and data connection being used by the second data transaction does not match any one of the records in the registry, the augmentation gateway determining that the second data transaction is the new transaction;

based on the second transaction being the new transaction, the computer receiving a second dataset being utilized in the second data transaction;

the computer determining a second data profile of the second dataset;

the computer determining that the persisted knowledge does not include the previous data profile that matches the second data profile;

based on the persisted knowledge not including the previous data profile that matches the second data profile, the computer generating a second sample of the second dataset by employing the stochastic data sampling technique;

based on the persisted knowledge not including the previous data profile that matches the second data profile, the computer determining and updating a second data size correction and a second data shape correction by employing second iterations of the statistical inference technique;

subsequent to the second iterations of the statistical inference technique, the computer correcting data in the second sample of the second dataset by utilizing the second data size correction and the second data shape correction to provide the data in the second sample with a second level of confidence that exceeds the threshold, the second level of confidence being a measure that the data in the second sample matches the requirements of the business;

based on the second data size correction and the second data shape correction, the computer determining second one or more filtering rules for correcting the second dataset;

the computer updating second configurations in the persisted knowledge with second parameters of the statistical inference technique, the second data size correction, the second data shape correction, and the second one or more filtering rules;

based on the updated second configurations in the persisted knowledge, the computer generating second recommendations of second modifications to one or more queries of the second data transaction;

the computer determining that an application of the second recommendations of the second modifications to the one or more queries of the second data transaction provides data in the second dataset with the second level of confidence of matching the requirements of the business that exceeds the threshold; and based on the application of the second recommendations providing the data in the second dataset with the second level of confidence exceeding the threshold, the augmentation gateway modifying the one or more queries of the second data transaction to provide the data in the second dataset with the second level of confidence exceeding the threshold.

7. The method of claim 6, further comprising the step of prior to processing the current data transaction, the augmentation gateway adding the source, the destination, and the data connection used by the second data transaction to the record in the registry of transactions previously processed by the operational data rationalization system, wherein the step of determining that the current data transaction is not the new transaction includes the augmentation gateway determining that the current data transaction matches a known transaction by the augmentation gateway finding that the source, the destination, and the data connection being used by the current transaction matches the source, the destination, and the data connection used by the second data transaction included in the record in the registry of transactions previously processed by the operational data rationalization system.

8. The computer system of claim 4, wherein the method further comprises the steps of:

the augmentation gateway determining that a source, a destination, and a data connection being used by a second data transaction does not match any one of the records in the registry of transactions previously processed by the operational data rationalization system;

based on the determination that the source, destination, and data connection being used by the second data transaction does not match any one of the records in the registry, the augmentation gateway determining that the second data transaction is the new transaction;

based on the second transaction being the new transaction, the computer receiving a second dataset being utilized in the second data transaction;

the computer determining a second data profile of the second dataset;

the computer determining that the persisted knowledge does not include the previous data profile that matches the second data profile;

based on the persisted knowledge not including the previous data profile that matches the second data profile, the computer generating a second sample of the second dataset by employing the stochastic data sampling technique;

based on the persisted knowledge not including the previous data profile that matches the second data profile, the computer determining and updating a second data size correction and a second data shape correction by employing second iterations of the statistical inference technique;

subsequent to the second iterations of the statistical inference technique, the computer correcting data in the second sample of the second dataset by utilizing the second data size correction and the second data shape correction to provide the data in the second sample with a second level of confidence that exceeds the threshold, the second level of confidence being a measure that the data in the second sample matches the requirements of the business;

based on the second data size correction and the second data shape correction, the computer determining second one or more filtering rules for correcting the second dataset;

the computer updating second configurations in the persisted knowledge with second parameters of the statistical inference technique, the second data size correction, the second data shape correction, and the second one or more filtering rules;

based on the updated second configurations in the persisted knowledge, the computer generating second recommendations of second modifications to one or more queries of the second data transaction;

the computer determining that an application of the second recommendations of the second modifications to the one or more queries of the second data transaction provides data in the second dataset with the second level of confidence of matching the requirements of the business that exceeds the threshold; and based on the application of the second recommendations providing the data in the second dataset with the second level of confidence exceeding the threshold, the augmentation gateway modifying the one or more queries of the second data transaction to provide the data in the second dataset with the second level of confidence exceeding the threshold.

9. The computer system of claim 8, wherein the method further comprises the step of prior to processing the current data transaction, the augmentation gateway adding the source, the destination, and the data connection used by the second data transaction to the record in the registry of transactions previously processed by the operational data rationalization system, wherein the step of determining that the current data transaction is not the new transaction includes the augmentation gateway determining that the current data transaction matches a known transaction by the augmentation gateway finding that the source, the destination, and the data connection being used by the current transaction matches the source, the destination, and the data connection used by the second data transaction included in the record in the registry of transactions previously processed by the operational data rationalization system.

10. The computer program product of claim 5, wherein the method further comprises the steps of:

the augmentation gateway determining that a source, a destination, and a data connection being used by a second data transaction does not match any one of the records in the registry of transactions previously processed by the operational data rationalization system;

based on the determination that the source, destination, and data connection being used by the second data transaction does not match any one of the records in the registry, the augmentation gateway determining that the second data transaction is the new transaction;

based on the second transaction being the new transaction, the computer receiving a second dataset being utilized in the second data transaction;

the computer determining a second data profile of the second dataset;

the computer determining that the persisted knowledge does not include the previous data profile that matches the second data profile;

based on the persisted knowledge not including the previous data profile that matches the second data profile, the computer generating a second sample of the second dataset by employing the stochastic data sampling technique;

based on the persisted knowledge not including the previous data profile that matches the second data profile, the computer determining and updating a second data size correction and a second data shape correction by employing second iterations of the statistical inference technique;

subsequent to the second iterations of the statistical inference technique, the computer correcting data in the second sample of the second dataset by utilizing the second data size correction and the second data shape correction to provide the data in the second sample with a second level of confidence that exceeds the threshold, the second level of confidence being a measure that the data in the second sample matches the requirements of the business;

based on the second data size correction and the second data shape correction, the computer determining second one or more filtering rules for correcting the second dataset;

the computer updating second configurations in the persisted knowledge with second parameters of the statistical inference technique, the second data size correction, the second data shape correction, and the second one or more filtering rules;

based on the updated second configurations in the persisted knowledge, the computer generating second recommendations of second modifications to one or more queries of the second data transaction;

the computer determining that an application of the second recommendations of the second modifications to the one or more queries of the second data transaction provides data in the second dataset with the second level of confidence of matching the requirements of the business that exceeds the threshold; and based on the application of the second recommendations providing the data in the second dataset with the second level of confidence exceeding the threshold, the augmentation gateway modifying the one or more queries of the second data transaction to provide the data in the second dataset with the second level of confidence exceeding the threshold.

11. The computer program product of claim 10, wherein the method further comprises the step of prior to processing the current data transaction, the augmentation gateway adding the source, the destination, and the data connection used by the second data transaction to the record in the registry of transactions previously processed by the operational data rationalization system, wherein the step of determining that the current data transaction is not the new transaction includes the augmentation gateway determining that the current data transaction matches a known transaction by the augmentation gateway finding that the source, the destination, and the data connection being used by the current transaction matches the source, the destination, and the data connection used by the second data transaction included in the record in the registry of transactions previously processed by the operational data rationalization system.

* * * * *